Dec. 22, 1931.   A. ADE   1,837,940

TRAILER COUPLING

Filed Jan. 13, 1930

Inventor: Anton Ade

Patented Dec. 22, 1931

1,837,940

UNITED STATES PATENT OFFICE

ANTON ADE, OF MUNICH, GERMANY, ASSIGNOR TO DIREKTOR ARTHUR ADE, OF WALTERSHAUSEN, GERMANY

TRAILER COUPLING

Application filed January 13, 1930, Serial No. 420,428, and in Germany January 21, 1929.

The present invention relates to a coupling adapted more especially for motor car trailers, in which reliable means are provided to prevent accidental uncoupling through the coupling bolt being jerked out or disengaged on very rough roads or in consequence of the leverage of the draw fork in the coupling box. To attain this end the coupling is provided with a locking device actuated from the spindle operating the coupling bolt in such manner that said device is automatically unlocked before the coupling bolt is disengaged and again automatically locked after engagement of the coupling bolt.

Figure 1:
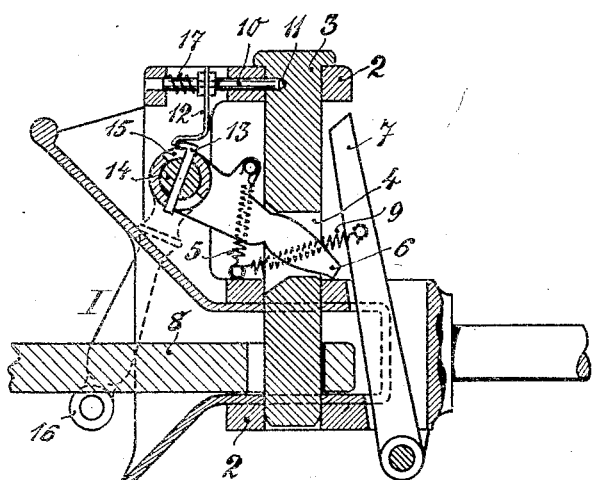
Figure 2:
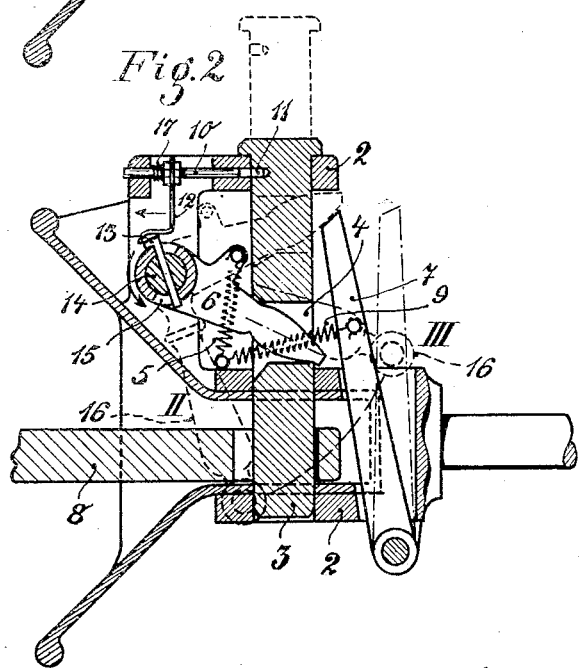

In the accompanying drawings one form of the present invention is shown in section, Fig. 1 showing the coupling with the bolt locked in position, whilst in Fig. 2 the pin of the locking device is drawn back, leaving the coupling bolt free to disengage.

Reference being had to the accompanying drawings, coupling bolt 3 moves in the coupling box 2 and possesses a slot 4 through which the disengaging arm 6 protrudes; arm 6 is under influence of the spring 5. When arm 6 is swung upwards it will be held in the highest position by the lever 7 engaging its end, as shown by the dotted lines in Fig. 2. By this means the coupling bolt 3 is held in its upper or uncoupled position until the eye bolt 8 of the trailer abuts against the lower part of lever 7, pushing it back against the tension of the spring 9, thus freeing arm 6 and coupling bolt 3. The latter is then free to descend and engage with the eye bolt 8.

The afore-mentioned locking device comprises a pin 10 guided in the upper part of the coupling box 2 and adapted to engage in a recess 11 (Fig. 2) of the coupling bolt 3 when the latter is in its lowest or coupling position, as shown in Fig. 1. In this manner the coupling bolt 3 and therefore the coupling as a whole is locked in position and accidental uncoupling made impossible.

When uncoupling, the pin 10 must be drawn out of the bolt 3 before the latter can be lifted. This is automatically attained in the form of the device under consideration with the help of an angle piece 12 rigidly attached to pin 10, said angle piece abutting against a driver 13 arranged on the operating spindle 14. The latter also actuates the disengaging arm 6 which is loosely pivoted on spindle 14; the bearing bush of arm 6 is provided with apertures 15 limiting the movement of the driver 13 relative to said bush.

The operation of the device, when uncoupling, is as follows:

If from the initial position I (Fig. 1) the lever or arm 16 of the operating spindle 14 is moved in the direction of the arrow either directly or indirectly from the driver's seat, the driver 13 will at first move within the aperture 15 and only actuate the pin 10, withdrawing it from the recess 11 of the coupling bolt 3. When the driver 13 has reached the limit of its motion within the aperture 15, it will be in the position II (Fig. 2); a further rotation of the spindle 14 will now lift the arm 6 and with it the coupling bolt 3, until they have reached the highest position III, shown in Fig. 2 by dotted lines. In this position the coupling is open and the spring pressed lever 7 holds the coupling in the open position, as already described. During the last phase of the movement of the arm 6 and bolt 3 the driver 13 will disengage from the angle piece 12 of the pin 10, and the latter will, under the influence of spring 17, abut against the coupling bolt 3; pin 10 cannot, however, engage with bolt 3 until the latter falls into its lower or coupling position, thus bringing the recess 11 opposite to pin 10.

Coupling is effected by introducing the eye bolt 8 into the funnel of the coupling box 2; as soon as the end of the eye bolt 8 abuts against the lever 7, arm 6 and coupling bolt 3 are released and the latter falls downwards, engaging with the eye bolt 8 and being again automatically locked in position by pin 10. The entire coupling is now again in the initial position shown in Fig. 1.

What I claim as my invention and desire to secure by Letters Patent, is:

1. In a trailer coupling, a suitably guided coupling bolt, means for holding the bolt in operative position, and manually operated means connected to the means for holding the bolt for moving the said holding means to release said bolt, and a bolt moving means actuated by the manually operated means for moving said bolt axially to release a coupling member.

2. In a trailer coupling, an axially movable coupling bolt, a locking pin for holding the bolt in operative position, an operating spindle, means moved by the operating spindle for disengaging the locking pin from the bolt, a member actuated by the spindle for moving the bolt axially when released by the locking pin, and a manually operated means for partially rotating the spindle.

3. In a trailer coupling, an axially movable coupling bolt, an operating spindle, a locking pin adapted to engage the coupling bolt to hold it in operative position, a driver carried by the spindle and operative to move the locking pin to disengage it from the bolt, a member carried by the spindle operative to move the coupling bolt axially, and manually operated means for operating the spindle.

4. In a trailer coupling, a coupling bolt, a spindle, a bearing bushing for the spindle, the bearing bushing being provided with an aperture, a driver carried by the spindle and extending through the aperture, the said driver having its movement limited by the bushing, manually operated means for turning the bushing, and a member on said spindle engaging the coupling bolt for moving it axially.

5. In a trailer coupling, a coupling bolt, a spindle, a bearing bushing for the spindle, the bearing bushing being provided with an aperture, a driver carried by the spindle and extending through the aperture, the said driver having its movement limited by the bushing, manually operated means for turning the bushing, a member on said spindle engaging the coupling bolt for moving it axially, and means adapted to engage the last mentioned member for holding the coupling bolt in elevated position.

6. In a trailer coupling, a coupling bolt, a spindle, a bearing bushing for the spindle, the bearing bushing being provided with an aperture, a driver carried by the spindle and extending through the aperture, the said driver having its movement limited by the bushing, manually operated means for turning the bushing, an arm on said spindle engaging the coupling bolt for moving it axially, means adapted to engage the last mentioned member for holding the coupling bolt in elevated position, and a cooperative coupling member operative to move the bolt holding member and to release the arm.

In testimony whereof I affix my signature.

ANTON ADE.